United States Patent
McDonald et al.

(10) Patent No.: US 7,027,579 B1
(45) Date of Patent: Apr. 11, 2006

(54) SYSTEM AND METHOD FOR MANAGING INCOMING TELEPHONE CALLS

(75) Inventors: Randy Michael McDonald, Roswell, GA (US); Delayne Heredia McDonald, Roswell, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 243 days.

(21) Appl. No.: 10/231,182

(22) Filed: Aug. 30, 2002

(51) Int. Cl.
  *H04M 3/42* (2006.01)
(52) U.S. Cl. .............................. 379/211.01; 379/207.16; 379/211.02
(58) Field of Classification Search ........... 379/207.02, 379/207.03, 199, 188, 201.01, 211.01, 207.16, 379/211.02
  See application file for complete search history.

(56) References Cited

U.S. PATENT DOCUMENTS

| | | | | |
|---|---|---|---|---|
| 4,277,649 A | * | 7/1981 | Sheinbein | 379/211.02 |
| 4,278,844 A | * | 7/1981 | Jones | 379/157 |
| 4,672,660 A | * | 6/1987 | Curtin | 379/88.19 |
| 4,899,358 A | * | 2/1990 | Blakley | 379/284 |
| 5,060,255 A | * | 10/1991 | Brown | 379/88.22 |
| 5,222,124 A | * | 6/1993 | Castaneda et al. | 379/88.22 |
| 5,757,899 A | * | 5/1998 | Boulware et al. | 379/196 |
| 5,872,840 A | | 2/1999 | Wu | |
| 6,115,602 A | * | 9/2000 | Dee et al. | 455/406 |
| 6,215,857 B1 | | 4/2001 | Kasiviswanathan | |
| 6,263,071 B1 | * | 7/2001 | Swan et al. | 379/372 |
| 6,574,470 B1 | * | 6/2003 | Chow et al. | 455/417 |
| 2002/0085698 A1 | * | 7/2002 | Liebenow | 379/207.13 |
| 2002/0114431 A1 | * | 8/2002 | McBride et al. | 379/88.21 |
| 2002/0154752 A1 | * | 10/2002 | Carpenter | 379/201.01 |
| 2003/0076941 A1 | * | 4/2003 | Tiliks et al. | 379/196 |
| 2003/0095651 A1 | * | 5/2003 | Book et al. | 379/211.01 |
| 2003/0215070 A1 | * | 11/2003 | Akhteruzzaman et al. | 379/88.19 |
| 2003/0215078 A1 | * | 11/2003 | Brahm et al. | 379/211.02 |
| 2004/0005045 A1 | * | 1/2004 | Adams et al. | 379/201.02 |

* cited by examiner

*Primary Examiner*—Bing Q. Bui
(74) *Attorney, Agent, or Firm*—Thomas, Kayden, Horstemeyer & Risley

(57) ABSTRACT

A method for managing telephone calls including the steps of obtaining from a subscriber of a telephone line an authorization to activate a quiet time period, receiving an incoming call for a telephone number associated with the telephone line, determining whether the quiet time period has expired, terminating the call if the quiet time period has expired, and providing an alternative call treatment during the quiet time period. The quiet time period can include a default amount of time. Alternatively, the quiet time period can include an amount of time specified by the subscriber at the time of obtaining the authorization. The alternative call treatment can include one of playing a busy signal, forwarding the incoming call to a voice mailbox, forwarding the incoming call to another telephone line, playing a greeting recorded by the subscriber, and playing a greeting indicating when the quiet time period will expire. Provisions are made for an authorized calling party to bypass the quiet time period.

22 Claims, 8 Drawing Sheets

SYSTEM AND METHOD FOR MANAGING INCOMING TELEPHONE CALLS

FIELD OF THE INVENTION

The present invention relates generally to the field of telecommunications and, more particularly, to systems and methods for managing telephone calls.

BACKGROUND OF THE INVENTION

Many individuals, particularly when they are at home, require some kind of "quiet time" during which no one disturbs them. For example, a parent with a sick child may wish that no one would call when the child is taking a nap. However, it seems that invariably the telephone would ring during the quiet time. Most individuals respond by unplugging the telephone, turning the ringer off altogether, or subscribing to a Do Not Disturb (DND) service provided by their telephone companies. Although these solutions are effective in prevent the telephone from ringing, the solutions also create new problems. For example, many telephone users often forget to reconnect the telephone, turn the ringer back on, or deactivate the DND service when their need for the quiet time is over. As a result, these users would miss many potentially important calls both during and after the quiet time.

Accordingly, there is a need for a telephone service that would allow telephone users to prevent their telephone from ringing, but would deactivate the service automatically upon expiration of the quiet time without further action from the telephone users.

SUMMARY OF THE INVENTION

The present invention relates to systems and methods for managing telephone calls. A preferred embodiment of the invention provides a method for managing incoming calls that includes the following steps. First, an authorization from a subscriber of a telephone line is obtained. Authorization can be in the form of the subscriber dialing a feature activation code using the telephone line with which the service is associated. The feature activation code can be, for example, "*99". The authorization is preferably associated with a quiet time period. For example, the authorization can include a default amount of time during which a customer premises equipment (CPE) (e.g., a telephone) associated with the telephone line of the subscriber would not ring. The default time can be, for example, about 30 minutes. Second, an incoming call is received for the telephone number associated with the telephone line. Third, a determination is made as to whether the quiet time period has expired. Fourth, if the quiet time period has expired, the incoming call is terminated to the subscriber's telephone line, and the CPE of the subscriber rings. Otherwise, if the incoming call is received during the quiet time period, the incoming call is provided with an alternative call treatment. The alternative call treatment can include, for example, playing a busy signal for the calling party, forwarding the call to a voice mailbox of the subscriber, forwarding the call to a second telephone line designated by the subscriber or another treatment.

Another preferred embodiment of the invention provides a telephone switch that includes a microprocessor adapted to: (1) obtain an authorization from a subscriber of a telephone line; (2) receive an incoming call intended for the subscriber for the telephone number associated with the telephone line; (3) terminate the incoming call to a CPE associated with the telephone line if a quiet time period has expired; and (4) provide an alternative call treatment during the quiet time period.

Still another preferred embodiment of the invention provides a method for using a telephone switch that includes the following steps. First, the switch obtains from a subscriber of a telephone line an authorization to activate a quiet time period. Second, the switch provides an alternative call treatment for all calls received at the telephone line during the quiet time period. Third, the switch rings a CPE associated with the telephone line upon expiration of the quiet time period.

In still another preferred embodiment, the invention provides a method for managing incoming calls comprising the steps of: (1) obtaining from a subscriber of a telephone line an authorization associated with a quiet time period; (2) receiving an incoming call for the telephone number associated with the telephone line; (3) forwarding the incoming call to a voice mailbox during the quiet time period; and (4) ringing a CPE associated with the telephone line upon expiration of the quiet time period. Preferably, the method also allows the incoming call to be terminated during the quiet time period if a calling party associated with the incoming call provides a valid password or is otherwise authorized to bypass the service.

DETAILED DESCRIPTION OF THE INVENTION

Briefly, a preferred embodiment of the invention allows a subscriber to access the local serving switch site and perform a Customer Originated Recent Change (CORC). The subscriber can perform the CORC in a number of ways. For example, the subscriber can dial an access number or a feature code to activate a quiet time period. Alternatively, as known in the art, the subscriber could perform the CORC via the Internet using a web-based application. When the specified time is up or when the quiet time period has expired, all calls are terminated to the subscriber automatically. In other words, while the subscriber needs to activate the service, the subscriber does not need to deactivate it. Deactivation is done automatically upon expiration of the quiet time period.

Figure 1:
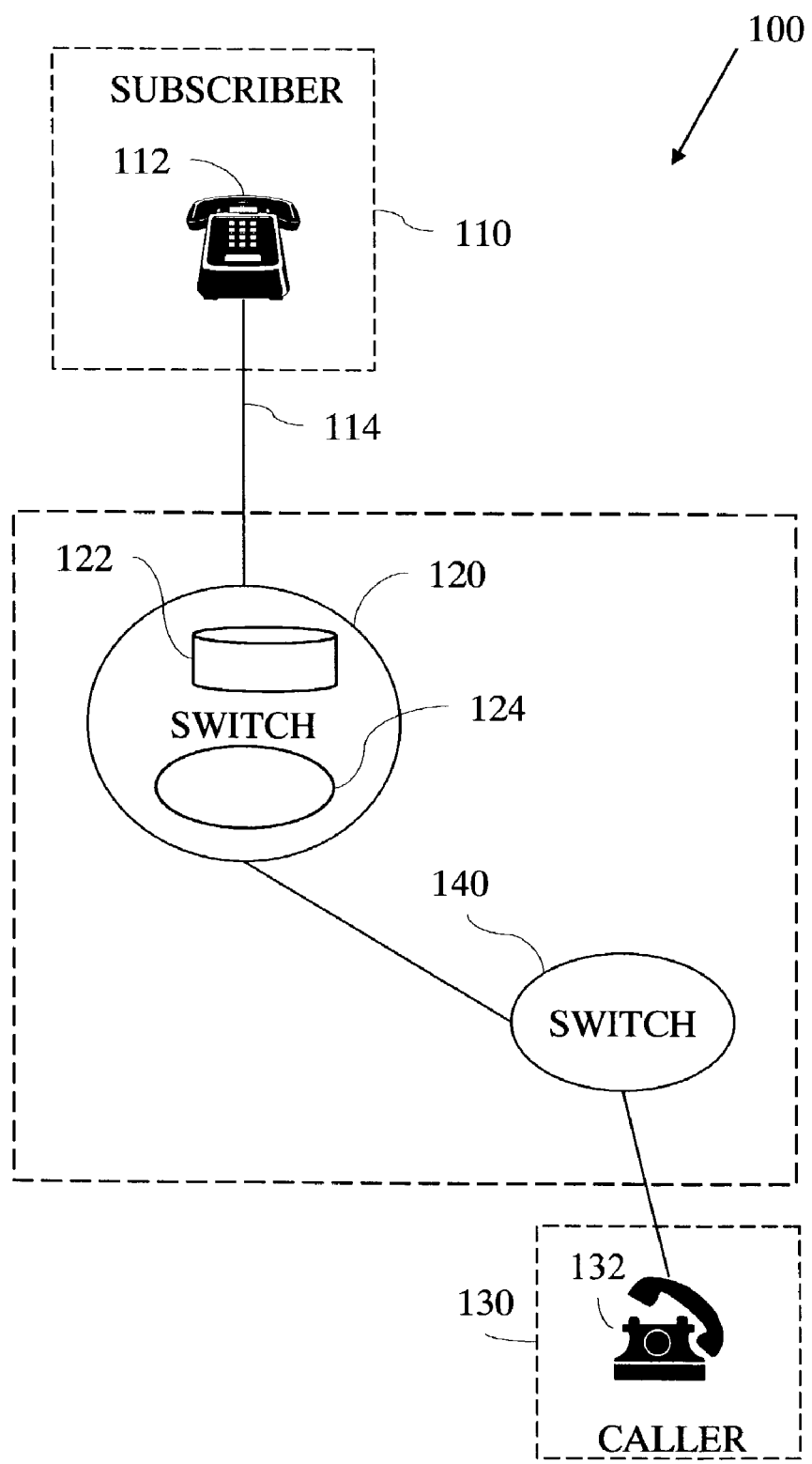
FIG. 1 is a schematic diagram showing the system architecture used in a preferred embodiment of the invention.

FIG. 1 is a schematic diagram showing a system architecture that can be used in a preferred embodiment of the invention.

System 100 is a telephone network that includes switch 120 and switch 140. When caller 130 uses telephone 132 to dial a telephone number associated with telephone line 114 of subscriber 110, CPE 112 (e.g., a telephone set) rings. The communications session between caller 130 and subscriber 110 involves switch 120 that serves telephone line 114, and other elements of system 100, including, for example, switch 140 (in some cases, where telephone 132 and CPE 112 are serviced by the same switch, switch 120 and 140 would be the same switch).

Subscriber 110 is a user of the present invention. Switch 120 serves telephone line 114 of subscriber 110. Switch 120 includes database 122 and microprocessor 124. Microprocessor 124 is adapted to implement a preferred embodiment of the invention. For example, microprocessor 124 is adapted to recognize an access number or a special feature code dialed by subscriber 110. When subscriber 110 uses CPE 112 to dial the access number, e.g., *99, microprocessor 124 understands that subscriber 110 wishes to activate a quiet time period of the invention.

Accordingly, microprocessor 124 reviews information in database 122 to determine whether there is a default amount of quiet time associated with subscriber 110. If there is a default quiet time period, e.g., about 30 minutes, associated with subscriber 110, microprocessor 124 plays an announcement to subscriber 110, e.g., "Please press or say one if you want to suspend all calls for the next 30 minutes. Please press or say two if you want to specific a different duration for your quiet time."

If subscriber 110 presses or says one, microprocessor 124 provides an alternative call treatment to all incoming calls that are received for the telephone number during the next 30 minutes. The alternative call treatment means that CPE 112 and any additional CPE associated with telephone line 114 would not ring during the quiet time period.

The alternative call treatment can be, for example, forwarding the calls to a voice mailbox associated with subscriber 110. Another alternative call treatment may be, for example, forwarding the calls to a different telephone line designated by subscriber 110. Still another alternative call treatment may involve switch 120 playing an announcement for the caller. For example, switch 120 may say, "The party you wish to reach is unavailable to take your call, please call back later." Preferably, the announcement would indicate how soon the caller should call back based on the amount of time left before the quiet time period expires. Still another alternative treatment is to play a busy signal for the calling party.

Upon expiration of the quiet time period, i.e., 30 or more minutes have elapsed since subscriber 110 activated the service, microprocessor 124 deactivates the service without further input from subscriber 110. All subsequent incoming calls for the telephone number are then terminated normally, i.e., CPE 112 rings when a call is received at telephone line 114.

Figure 2:
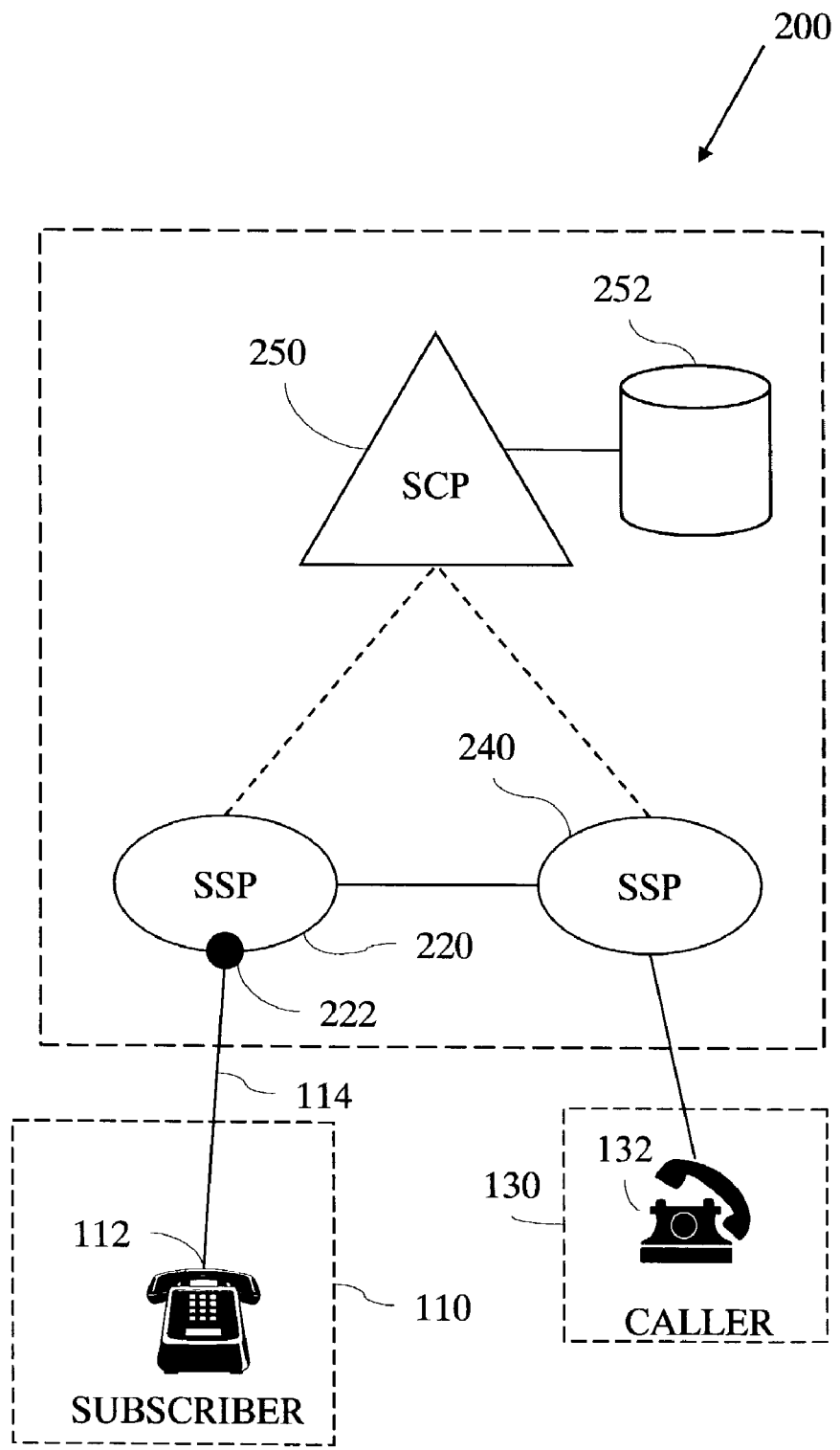
FIG. 2 is a schematic diagram showing the system architecture used in another preferred embodiment of the invention using an Advanced Intelligent Network (AIN).

FIG. 2 is a schematic diagram showing the system architecture used in another preferred embodiment of the invention involving an AIN.

System 200 is an exemplary AIN. System 200 includes SCP 250, database 252, SSP 220, and SSP 240. As known in the art, SCP 250 can be adapted to execute service logic programs. The service logic programs can be stored in database 252, which is accessible to SCP 250. A preferred method of the invention can be embodied in a service logic program so that incoming calls intended for subscriber 110 can be processed by SSP 220 using instructions received from SCP 250 in accordance with the service logic program.

A specific implementation of the invention in the AIN context may be done as follows. First, trigger 222 is provisioned at telephone line 114 at SSP 220. Trigger 222 is preferably an off-hook delay trigger. When subscriber 110 dials an access number or a feature activation code of the invention using CPE 112, SSP 220 sends a query to SCP 250. SCP 250 reviews the information in database 252, and instructs SSP 220 what to do. For example, SSP 220 may be instructed to collect an amount of time subscriber 110 wishes to whether he wishes to activate an "alarm clock" feature. The alarm clock feature means that CPE 112 would ring upon expiration of the quiet time period even if no incoming call was received during that time. It is noted that the present invention can be adapted for any telephone networks. Specifically, it has been contemplated that the present invention can be adapted for wireline networks including POTS and AIN, wireless networks, and IP based networks.

Figure 3:
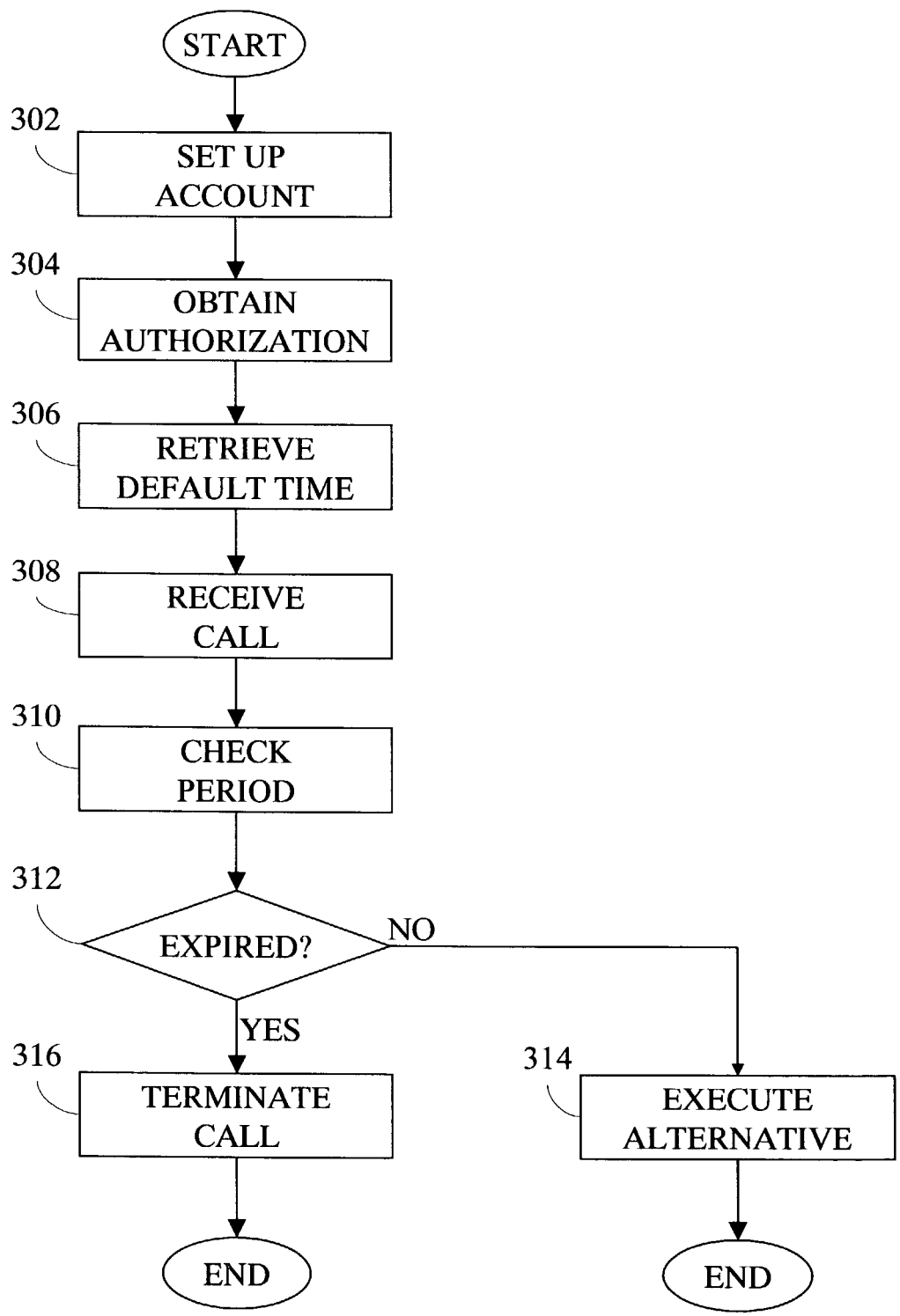
FIG. 3 is a flow diagram illustrating exemplary steps that could be used to implement a preferred embodiment of the invention.

FIG. 3 is a flow diagram illustrating exemplary steps that could be used to implement a preferred embodiment of the invention.

In step 302, a service provider of a subscriber (e.g., subscriber 10) and/or the subscriber sets up an account. In this step, a database may be populated with information related to the subscriber. The database may be, for example, one of database 122 and database 252 as shown in FIGS. 1 and 2, respectively. The subscriber information may include, for example, a default quiet time period and an alternative call treatment. The default period may be, for example, about 30 minutes for the subscriber. It is noted that different subscribers may have different amounts of default time. Of course, more than one subscriber may have an identical default time. The alternative call treatment may be, for example, forwarding all calls received during the quiet time period to a voice mailbox associated with the subscriber. Preferably, a switch serving the telephone line of the subscriber is adapted to implement the invention. For example, one of switch 120 and SSP 220 described above is used to implement the invention.

In step 304, the switch receives an authorization to activate a service of the invention. The authorization may be received when the subscriber picks up his telephone and dials an access number or a feature activation code. The feature activation code may be, for example, a dial string that includes a character and a number. An exemplary feature activation may be, for example, *99.

In step 306, the switch retrieves the default time associated with the subscriber. The default time may be obtained from one of database 122 and database 252. In an AIN context, this step may involve exchanges of AIN messages between SSP 220 and SCP 250.

In step 308, the switch receives an incoming call. The call may be originated by, for example, caller 130.

In step 310, the switch reviews the default time.

In step 312, the switch determines whether the incoming call is received during the feature activation period (the quiet time period), i.e., before the default time expires. This may be accomplished by determining the difference between the time at which the incoming call is received in step 308 and the time at which the subscriber activated the service in step 304. If the difference is shorter than the default time, the process goes to step 314; otherwise, the process goes to step 316. One of ordinary skill in the art would know of many different methods by which the determination in step 312 can be made.

In step 314, the switch executes the alternative call treatment. For example, the switch forwards the incoming call to the voice mailbox associated with the subscriber.

In step 316, the switch terminates the incoming call to the subscriber. In other words, a CPE associated with the subscriber, e.g., CPE 112, rings.

Figure 4:
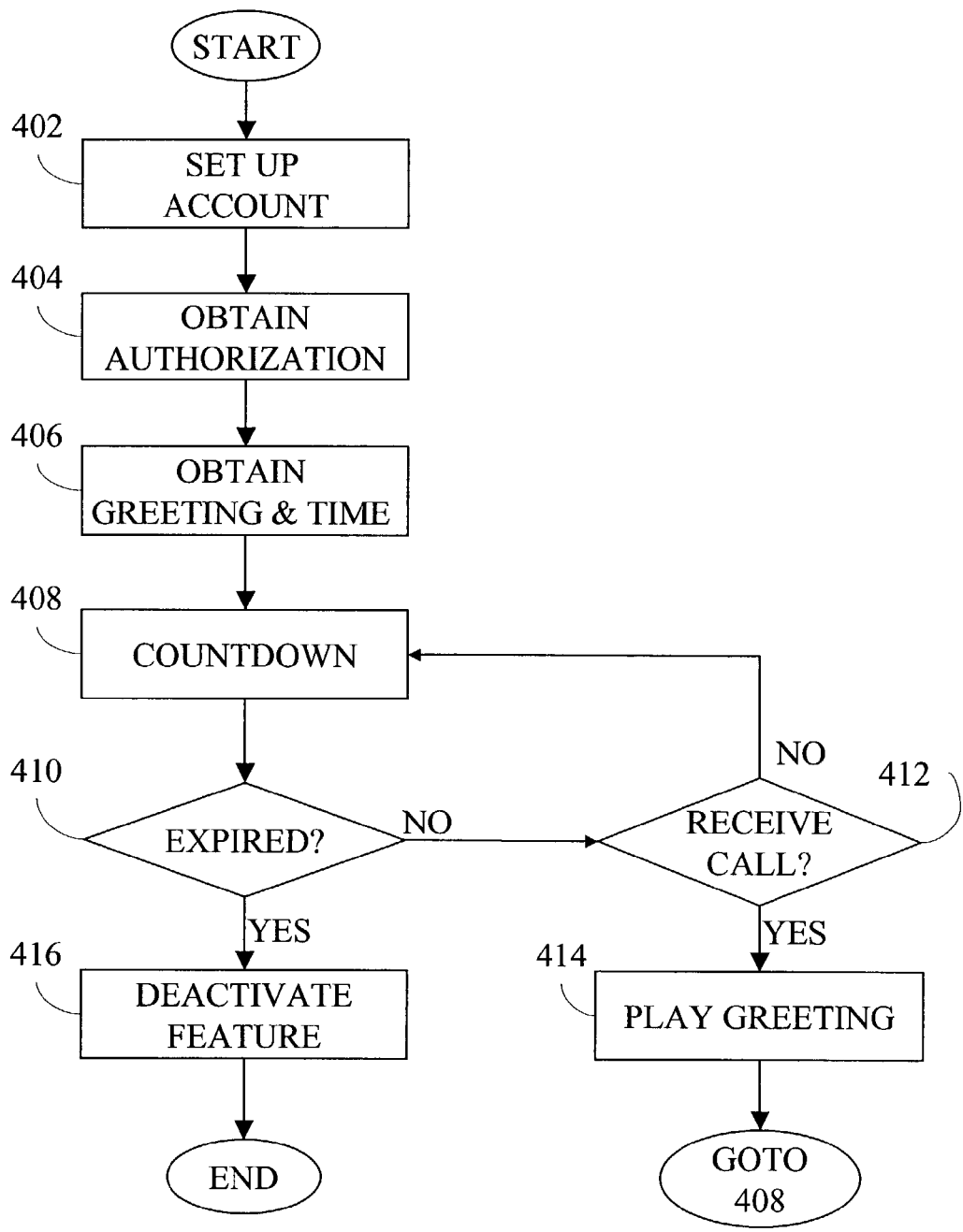
FIG. 4 is a flow diagram illustrating exemplary steps that could be used to implement another preferred embodiment of the invention.

FIG. 4 is a flow diagram illustrating exemplary steps that could be used to implement another preferred embodiment of the invention.

Steps 402 and 404 are generally similar to corresponding steps 302 and 304 described above.

In step 406, the switch initiates an interactive session with the subscriber. The interactive session may be implemented using, for example, one or both of Interactive Voice Response (IVR) and Dual-Tone Multi-Frequency (DTMF) technologies. The interactive session can include, for example, recording a greeting that the subscriber wishes to play for a caller that attempts to reach him during the quiet time period. The interactive session may also include, for example, receiving an alternative amount of time to be used as the quiet time period in lieu of the default time. An exemplary greeting recorded in this step may be, assuming the subscriber activates the service in step 404 for 30 minutes at 3 pm, "Hi, this is John. I am having my quiet time right now. Please call back after 3:30 pm. Thanks."

In step 408, the switch begins a countdown, i.e., the switch monitors the time remaining for the quiet time period. Here, if the default time is 30 minutes, a timer may be provisioned at the switch so that the time remaining will reduce from 30 minutes to zero. In the exemplary situation mentioned above involving subscriber John, the timer starts ticking away at 3 pm until the expiration time at 3:30 pm.

The process repeats steps 408, 410 and 412 during the quiet time period. If an incoming call is received in step 412 during the quiet time period, the process goes to step 414.

In step 414, the switch, recognizing that the quiet time period timer has not expired in step 410, plays a greeting previously recorded in step 406. For example, the switch plays and the calling party hears, "Hi, this is John. I am having my quiet time right now. Please call back after 3:30 pm. Thanks." Since the quiet time period has not expired, the process returns to step 408 after the greeting is played.

If the quiet time period expires in step 410, the process goes to step 416. In step 416, the switch deactivates the feature of the invention automatically. In other words, without further interaction with the subscriber, the switch terminates incoming calls to the telephone line of the subscriber as usual when the calls are received.

Figure 5:
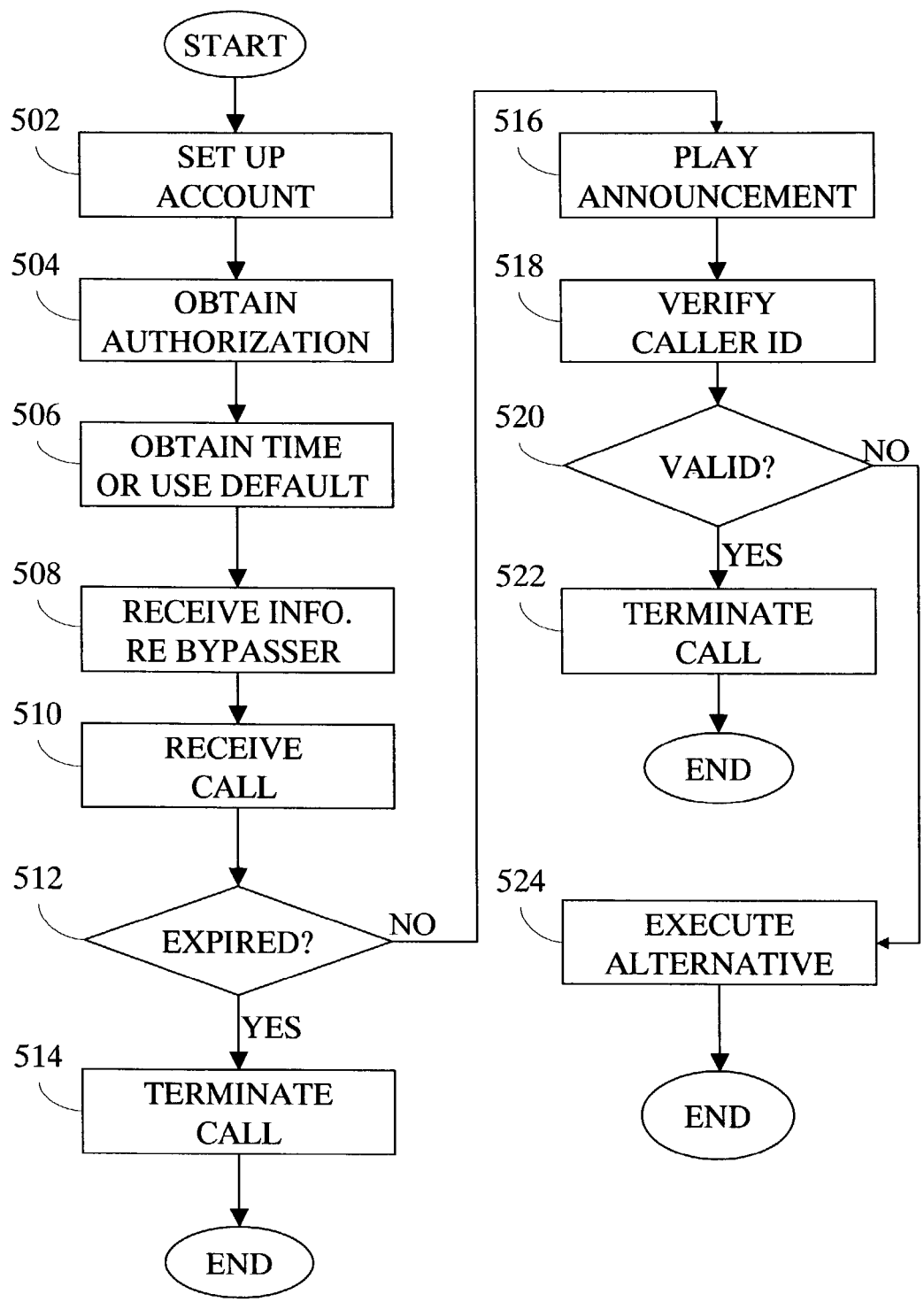
FIG. 5 is a flow diagram illustrating exemplary steps that could be used to implement another preferred embodiment of the invention.

FIG. 5 is a flow diagram illustrating exemplary steps that could be used to implement another preferred embodiment of the invention.

Steps 502 and 504 are generally similar to corresponding steps 302 and 304 described above.

In step 506, the switch initiates an interactive session with the subscriber. The interactive session may be implemented using, for example, one or both of IVR and DTMF or other similar technologies. The interactive session can include, for example, asking the subscriber whether the default time should be used. If the subscriber confirms that the default time should be used, the process goes to step 508. Otherwise, the switch prompts the subscriber to input an alternative amount of time to be used for the quiet time period. Acquisition of the new time may be done in a number of ways. For example, the switch can be adapted to play an announcement, "Please press or say one for 20 minutes, two for 40 minutes, three for 60 minutes." Alternatively, the subscriber may be invited to enter the time as follows, "Please use the keypad to enter the number of minutes you would like to have for your quiet time period." In other words, the subscriber may press the numbers "2" and "3" to indicate that 23 minutes is the amount of time he wishes to have for the quiet time period.

In step 508, the switch continues to interact with the subscriber. Here, the switch asks the subscriber whether he wishes to allow certain incoming calls to go through during the quiet time period. For example, if the subscriber wishes to receive no calls except those from a pediatrician, then the subscriber would want a call from the pediatrician to come through during the quiet time period. Thus, in this step, the switch may obtain information from the subscriber regarding how the quiet time feature of the invention may be bypassed by an authorized calling party, e.g., the pediatrician. In one implementation of the invention, the information obtained from the subscriber in this step may be a password, which must also be provided to the pediatrician to be used in step 518 below. In another implementation, the information obtained may be the pediatrician's telephone number to be verified in step 518.

In steps 510 and 512, if an incoming call is received during the quiet time period, the process goes to step 516. Otherwise, the process goes to step 514.

In step 514, the switch terminates the call to the subscriber after the quiet time period has expired. Again, the subscriber does nothing to deactivate the service.

In step 516, the switch plays an announcement. The announcement may be, for example, "The party you wish to reach is having a quiet time right now. Please enter the password if you have been provided with one." Alternatively, the announcement may be, "The party you wish to reach is having a quiet time right now. Please wait while I verify your identity." The announcement may also not mention a password or an identity verification—in that case, the caller would have been advised to enter the password or to wait while the announcement is being played.

Depending on how the service is implemented, in step 518, the switch can verify the identity of the calling party in at least two ways. For example, if the calling party provides a password in response to the announcement of step 516, the switch determines whether the received password matches that obtained from the subscriber in step 508. In another example, by using Automatic Number Identification (ANI) or similar technologies, the switch can obtain the telephone number of the calling party and check it against the telephone number obtained from the subscriber in step 508.

In step 520, based on the interactions between the calling party and the switch in steps 516 and 518, it is determined whether the password provided is valid or the calling party is one that the subscriber has identified in step 508. If so, the process goes to step 522. Otherwise, the process goes to step 524.

In step 522, the switch terminates the call to the subscriber notwithstanding the quiet time period has not expired. In other words, an authorized calling party is able to reach the subscriber during the quiet time period.

In step 524, the switch provides an alternative treatment to the call. As discussed above, the alternative treatment can include one of forwarding the call to a voice mailbox (step 314) and playing a greeting (step 414). Another alternative call treatment may be, for example, forwarding the call to a different telephone line designated by the subscriber. For example, the call may be forwarded to the subscriber's cell phone (where it won't disturb the whole household, and where the caller can leave a message on the cell phone's voicemail). Still another alternative call treatment may be to play a greeting indicating how much time is left before the quiet time period expires. Still another alternative call treatment is to play a busy signal.

Figure 6:
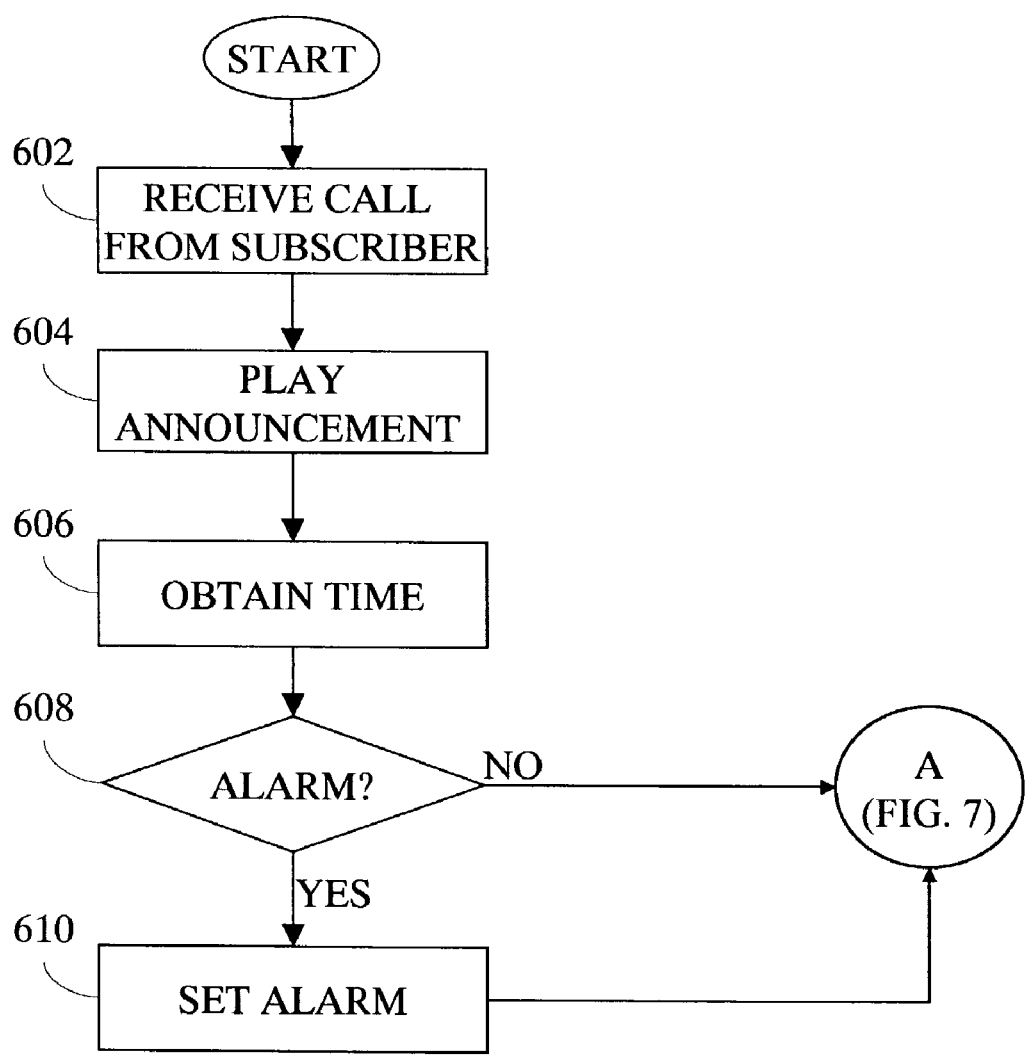
FIGS. 6, 7, and 8 are collectively a flow diagram illustrating exemplary steps that could be used to implement another preferred embodiment of the invention.
Figure 7:
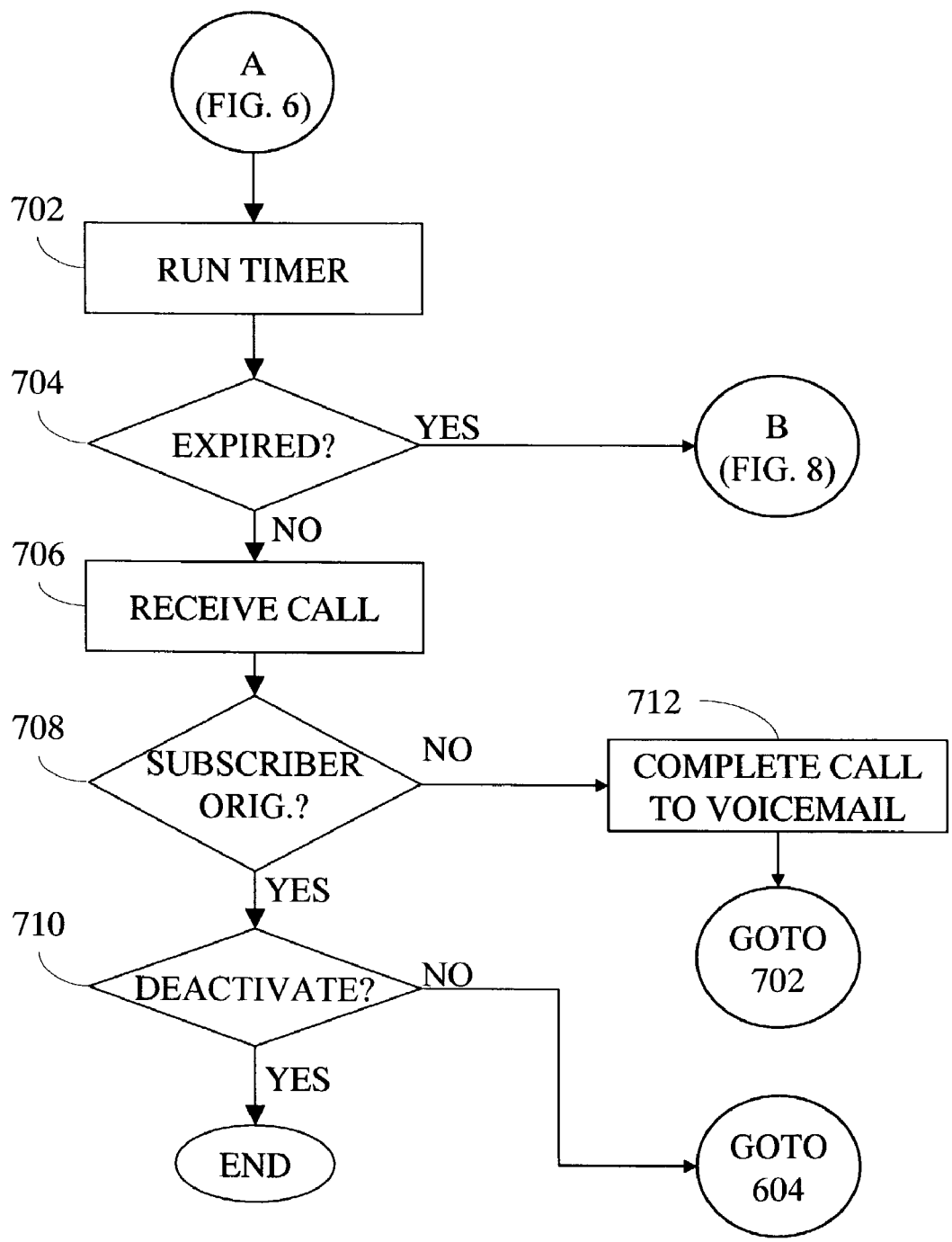
Figure 8:
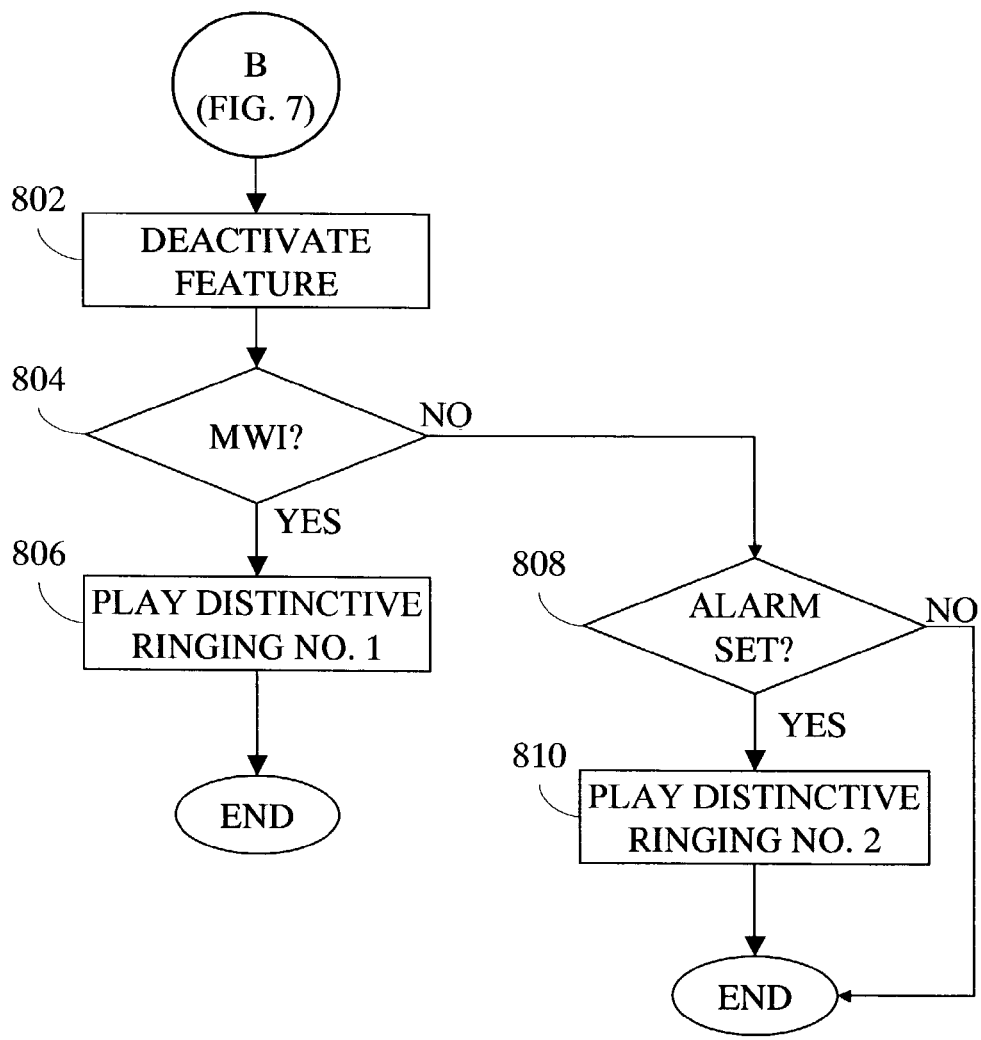

FIGS. 6, 7, and 8 are collectively a flow diagram illustrating exemplary steps that could be used to implement another preferred embodiment of the invention.

In step 602, a switch of the invention receives a call from a subscriber to activate the quiet time period of the invention. As explained above, one exemplary method for the subscriber to communicate with the switch is to dial a translatable feature activation code such as *99.

In step 604, the switch plays an announcement. The announcement may be, for example, "Please press or say one if you would like to set your quiet time to last 30 minutes; press or say two if you would like to set your quiet time to last 60 minutes; if you would like to set a different amount of time, please press the pound key followed by the number of minutes you would like your quiet time period to last."

In step 606, the switch obtains the response from the subscriber and sets the appropriate time for the quiet time period.

In step 608, the switch asks the subscriber whether the subscriber wishes to activate an alarm clock feature of the invention. If the subscriber responds affirmatively, the process goes to step 610; otherwise, the process goes to step 702 shown in FIG. 7.

In step 610, the switch sets the alarm. Setting the alarm could involve, for example, step 806 (discussed below) in which the subscriber's CPE would ring upon expiration of the quiet time period. Thus, the present invention can effectively serves as an alarm clock for the subscriber.

Referring now to FIG. 7, in step 702, the switch activates the quiet time period of the invention and monitors the timer in accordance with the amount of time obtained from the subscriber in step 606.

In step 704, if the timer expires before any call is received, the process goes to step 802 (shown in FIG. 8). Otherwise, the process goes to step 706.

In step 706, the switch receives a call during the quiet time period.

In step 708, the switch determines whether the call is originated by the subscriber. If so, the process goes to step 710; otherwise, the process goes to step 712.

In step 710, if the subscriber wishes to deactivate the service before the quiet time period expires, the switch complies and the process ends. In other words, the service is deactivated and the quiet time period is no longer in effect. However, if the subscriber has called to change any option, the process returns to step 604, which is shown in FIG. 6 and described above. This allows the subscriber to, for example, reset the amount of time for the quiet time period or any other options, including activation or deactivation of the alarm clock feature of the invention.

In step 712, the switch completes the call using an alternative call treatment. The alternative call treatment can be, for example, forwarding the call to a voice mailbox or a cell phone associated with the subscriber. As discussed above, the alternative call treatment can be other tasks that can be performed by the switch. The process then returns to step 702, in which the switch continues to monitor calls during the quiet time period.

Referring now to FIG. 8, in step 802, the switch deactivates the feature service of the invention upon the expiration of the quiet time period. After this step, all incoming calls are terminated to the subscriber as usual. Again, the subscriber does nothing to deactivate the service upon expiration of the quiet time period.

In step 804, the switch checks a message waiting indicator (MWI) to determine whether any voicemail messages have been left by any callers in step 712 during the quiet time period. If so, the process goes to step 806; otherwise, the process goes to step 808.

In step 806, the switch rings the CPE of the subscriber. The ringing can use a regular ringing tone that indicates arrival of an incoming call. Preferably, however, the switch uses a first distinctive ringing tone so that the subscriber knows that there are voicemail messages to be retrieved from the voice mailbox.

In step 808, if the alarm clock feature was not previously set in step 610, the process ends. Otherwise, the process goes to step 810.

In step 810, the switch rings the CPE of the subscriber. The ringing can use the regular ringing tone that indicates arrival of an incoming call. Preferably, however, the switch uses a second distinctive ringing tone so that the subscriber knows that the ringing is from the alarm clock feature, and not an indication of an incoming call or notification of voicemail messages.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for using a telephone switch comprising the step of:
   obtaining an authorization from a subscriber of a first telephone line to activate a quiet time period;
   processing at least one call received during the quiet time period using an alternative call treatment, wherein the alternative call treatment comprises forwarding the call to a second telephone line associated with the subscriber; and
   ringing a customer premises equipment associated with the first telephone line with a distinctive ringing tone upon an expiration of the quiet time period.

2. The method of claim 1, wherein the quiet time period comprises a default amount of time.

3. The method of claim 2, wherein the default amount of time is about 30 minutes.

4. The method of claim 1, further comprising the step of soliciting from the subscriber an amount of time to be used as the quiet time period.

5. The method of claim 1, further comprising the step of:
receiving the authorization via the Internet from the subscriber.

6. A method for managing incoming calls comprising the steps of:
obtaining an authorization from a subscriber of a telephone line to activate a quiet time period;
soliciting from the subscriber information associated with an authorized calling party;
terminating, at the telephone line, an incoming call originated by the authorized calling party during the quiet time period;
providing an alternative call treatment to an incoming call originated by other calling parties during the quiet time period; and
terminating, at the telephone line, all calls to the telephone line that arrive after expiration of the quiet time period; and
ringing a customer premises equipment of the subscriber with a first distinctive ring tone upon expiration of the quiet time period if no alternative call treatment was provided during the quiet time period.

7. The method of claim 6, wherein an identity of the authorized calling party is determined using a password.

8. The method of claim 6, wherein an identity of the authorized calling party is determined using a telephone number associated with the calling a party.

9. The method of claim 6, further comprising the step of:
ringing the customer premises equipment of the subscriber with a second distinctive ring tone upon expiration of the quiet time period if alternative call treatment was provided during the quiet time period.

10. The method of claim 6, wherein the alternative call treatment comprises one of playing a busy signal, forwarding the call to a voice mailbox, forwarding the call to a second telephone line, playing a greeting recorded by the subscriber, and playing a greeting that indicates a time when the quiet time period expires.

11. The method of claim 6, further comprising the step of:
receiving the authorization via the Internet from the subscriber.

12. A method for managing incoming calls comprising the steps of:
obtaining an authorization from a subscriber of a telephone line to activate a quiet time period;
soliciting from the subscriber information associated with an authorized calling party;
terminating, at the telephone line, an incoming call originated by the authorized calling party during the quiet time period;
providing an alternative call treatment to an incoming call originated by other calling parties during the quiet time period; and
terminating, at the telephone line, all calls to the telephone line that arrive after expiration of the quiet time period; and
ringing a customer premises equipment of the subscriber with a distinctive ring tone upon expiration of the quiet time period responsive to a voice message being received during the quiet time period.

13. The method of claim 12, wherein an identity of the authorized calling party is determined using a password.

14. The method of claim 12, wherein an identity of the authorized calling party is determined using a telephone number associated with the calling a party.

15. The method of claim 12, wherein the alternative call treatment comprises one of playing a busy signal, forwarding the call to a voice mailbox, forwarding the call to a second telephone line, playing a greeting recorded by the subscriber, and playing a greeting that indicates a time when the quiet time period expires.

16. The method of claim 12, further comprising the step of:
receiving the authorization via the Internet from the subscriber.

17. A method for managing incoming calls comprising the steps of:
obtaining an authorization associated with a quiet time period;
receiving an incoming call for a telephone number associated with the telephone line;
determining whether the quiet time period has expired;
terminating the call if the quiet time period has expired;
providing an alternative call treatment if the quiet time period has not expired; and
ringing a customer premises equipment of the subscriber with a first distinctive ring tone upon expiration of the quiet time period.

18. The method of claim 17, wherein the first distinctive ring is provided upon expiration of the quiet time period if alternative call treatment was provided during the quiet time period.

19. The method of claim 18, further comprising the step of:
ringing the customer premises equipment of the subscriber with a second distinctive ring tone upon expiration of the quiet time period if no alternative call treatment was provided during the quiet time period.

20. The method of claim 17, wherein the providing step comprises one of forwarding the call to a voice mailbox, forwarding the call to a second telephone line, and playing a greeting.

21. The method of claim 20, wherein the greeting was recorded by the subscriber.

22. The method of claim 20, wherein the greeting indicates a time when the quiet time period expires.

* * * * *